United States Patent [19]

Fadem

[11] Patent Number: 5,012,232

[45] Date of Patent: Apr. 30, 1991

[54] BIT MAPPED MEMORY PLANE WITH CHARACTER ATTRIBUTES FOR VIDEO DISPLAY

[75] Inventor: Richard J. Fadem, Roslyn Heights, N.Y.

[73] Assignee: NCR Corporation, Dayton, Ohio

[21] Appl. No.: 225,430

[22] Filed: Jul. 28, 1988

Related U.S. Application Data

[63] Continuation-in-part of Ser. No. 938,474, Dec. 5, 1986, abandoned.

[51] Int. Cl.⁵ .......... G06F 3/14

[52] U.S. Cl. .......... 340/750; 340/748; 340/803

[58] Field of Search .......... 340/703, 704, 723, 724, 340/748, 744, 750, 803, 804, 801, 735

[56] References Cited

U.S. PATENT DOCUMENTS

| | | | |
|---|---|---|---|
| 4,203,102 | 5/1980 | Hydes | 340/723 |
| 4,375,638 | 3/1983 | O'Keefe et al. | 240/726 |
| 4,482,979 | 11/1984 | May | 364/900 |
| 4,704,040 | 11/1937 | Takano et al. | 340/750 |

FOREIGN PATENT DOCUMENTS 0189140 7/1987 European Pat. Off. .

OTHER PUBLICATIONS

"Compression/Decompression of Fort Patterns", IBM Technical Disclosure Bulletin, vol. 28, No. 8, Jan. 1986, pp. 3563–3564.

Nicholson et al., "Attribute Countroller Display Modification", IBM Technical Disclosure Bulletin, vol. 21, No. 1, Jun. 1978, pp. 295–296.

Mersel, "Highlighting Image data on Pel for Pel Addressable Displays", IBM Technical Disclosure Bulletin, vol. 23, No. 6, Nov. 1980, pp. 2342–2343.

"Alphanumeric Display Buffer", IBM Technical Disclosure Bulletin, vol. 27, No. 10a, Mar. 1985, pp. 5530–5533.

*Primary Examiner*—Alvin E. Oberley

*Attorney, Agent, or Firm*—Wilbert Hawk, Jr.; Stephen F. Jewett; James M. Stover

[57] ABSTRACT

A video display controller for controlling the display of characters stored in a bit plane memory. The characters to be displayed are arranged in the bit plane memory in a set number of scan lines with a set number of data bits in each scan line. Attribute bits are included in one scan line of data bits in each character to be displayed. The controller includes a data bus for receiving data from the bit memory plane in bytes, each of which includes data bits of one scan line. Each data byte from the data bus is clocked into a shift register, with the data byte shifted out of the shift register sequentially, one bit at a time. Attribute bytes are selected from the data bus and an attribute logic circuit applies the attribute bits to the sequential data bits of a corresponding character to be displayed.

15 Claims, 9 Drawing Sheets

BIT MAPPED MEMORY PLANE WITH CHARACTER ATTRIBUTES FOR VIDEO DISPLAY

CROSS REFERENCES TO RELATED APPLICATIONS

This is a continuation-in-part of U.S. Application Ser. No. 938,474, filed Dec. 5, 1986, now abandoned.

BACKGROUND OF THE INVENTION

The present invention is related to systems for displaying video characters using bit mapped memory planes, and more particularly relates to providing character attributes to such systems.

In video terminal devices which display textual material such as used in computer systems, means are generally provided to provide visual attributes to characters in the text being displayed. These visual attributes cause a selected character or characters to blink, to have a high or low intensity, to be underlined, to be blanked out, to have a light character on a dark background, or to be reversed with a dark character on a light background. The attribute data is typically carried in the data string which carries the text to be displayed, and thus takes up one character position.

U.S. Pat. No. 3,895,374 to Williams for "Display Apparatus With Selective Text Formatting" issued July 15, 1975, discloses a system for displaying images of data characters with particular display attributes in one row of a display device and for displaying images of data characters in a succeeding row of the display device with the same display attributes. The disclosed system includes an attribute decoder for decoding an attribute character accompanying a data character.

U.S. Pat. No. 4,290,063 to Traster for "Video Display Terminal Having Means For Altering Data Words" issued Sept. 15, 1981, discloses a video display terminal having a means for converting some attribute codes to character codes to give more available character codes.

U.S. Pat. No. 4,342,989 to Watkins et al. for "Dual CRT Control Unit Synchronization System" issued Aug. 3, 1982, discloses a logic control unit wherein a substantially increased number of visual attributes per display row may be accommodated with minimal effect on data character transfer rates.

U.S. Pat. No. 4,384,285 to Long et al. for "Data Character Video Display System With Visual Attributes" issued May 17, 1983, discloses a video display system having a ROM memory for storing data characters to be displayed, means for decoding character codes to address characters in the ROM for display, and a visual attribute holding register for holding visual attribute bits to be applied to a single character or a row of characters.

U.S. Pat. No. 4,422,070 to Couper et al. for "Circuit For Controlling Character Attributes In A Word Processing System Having A Display" issued Dec. 20, 1983, discloses an attribute control having a latch for latching attribute signal information entered from the keyboard. The attribute signal information remains in the latch until the attribute latch is cleared or another attribute signal is entered from the keyboard.

U.S. Pat. No. 4,462,028 to Ryan et al. for "Access Control Logic For Video Terminal Display Memory" issued July 24, 1984, discloses a video terminal system in which the video character codes and visual attribute codes are independently applied to the video display logic.

SUMMARY OF THE INVENTION

In a specific embodiment, the invention is related to a video display controller for controlling the display of characters stored in a bit plane memory, each character being arranged in a set number of scan lines with a set number of data bits in each scan line. Attribute bits are included in one scan line of data bits of each character in the bit plane memory. The video display controller includes a data bus for receiving data bytes from the bit plane memory. Each of the data bytes includes the data bits of a single scan line of a character to be displayed. A shifting device is connected to the data bus and has an output on which is sequentially placed each data bit of a data byte. A selecting circuit is connected to the data bus for selecting attribute bytes from the data bus. Each of the attribute bytes has the attribute bits of its corresponding character to be displayed. An attribute logic device has a first input connected to the output of the shifting device and a second input connected to the selecting circuit. The attribute logic device applies the attribute bits of an attribute byte to the data bits of a scan line of a corresponding character to be displayed.

An object of the present invention is to provide an apparatus for use with a bit mapped memory plane for a video display wherein attribute bits are stored in a row of normally unused bits of a character matrix.

Another object of the present invention is to provide an apparatus wherein attribute bits are stored in a bit mapped memory plane, and wherein circuitry is provided to blank out the stored attribute bits when the data in the bit mapped memory plane is displayed.

Another object of the present invention is to provide an apparatus wherein attribute bits are stored as part of a stored character in a bit mapped memory plane.

These and other objects of the present invention will become apparent from the description of the preferred embodiment and drawings herein.

BRIEF DESCRIPTION OF THE DRAWINGS

FIGS. 9A and 9B, joined along line b—b, form a schematic diagram of an attribute logic circuit of the display controller;

DESCRIPTION OF THE PREFERRED EMBODIMENT

Figure 1:
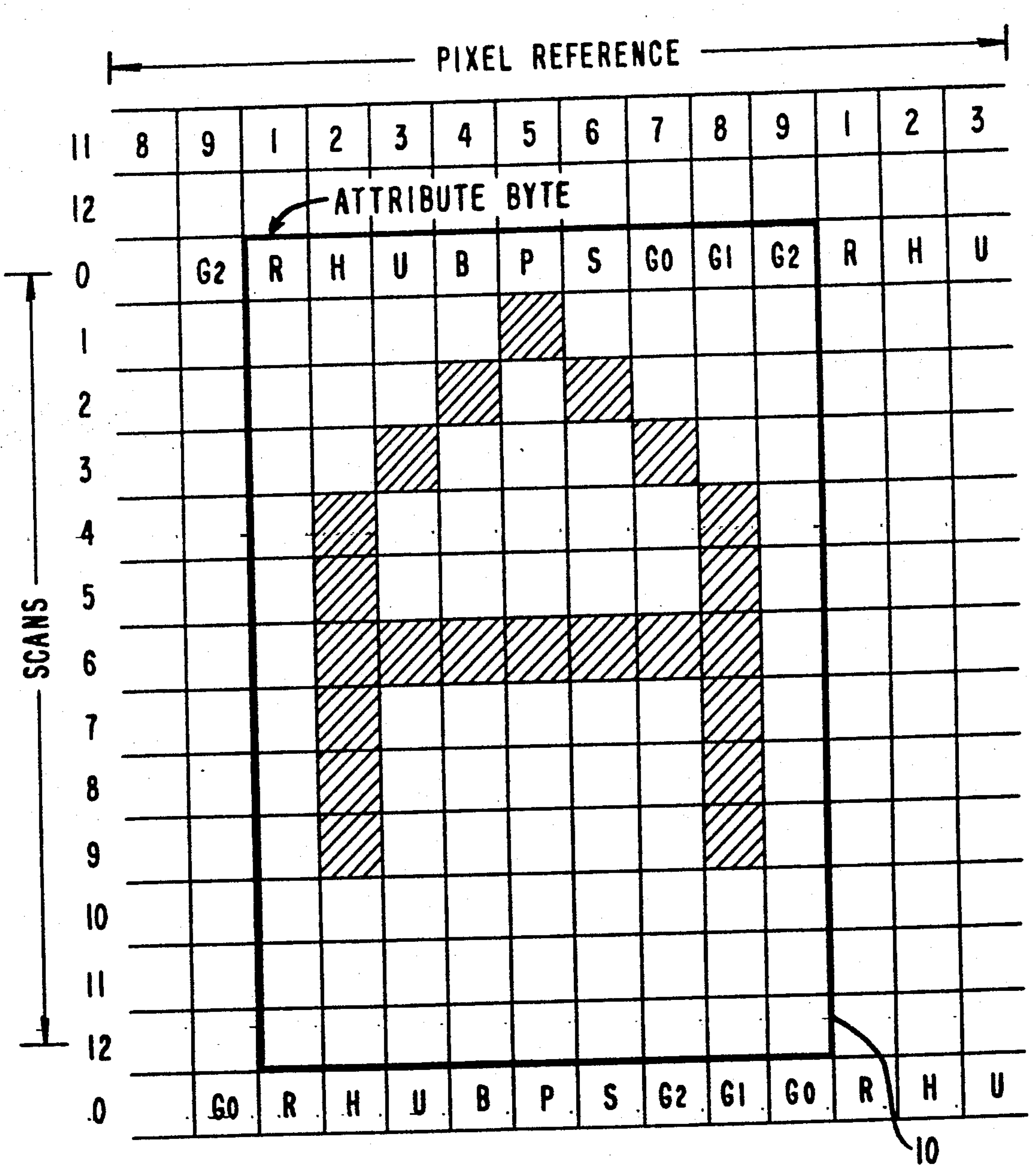
FIG. 1 is a diagram of a portion of a bit mapped memory plane having character attributes, and wherein selected bits are turned on to form the character "A"

FIG. 1 is a diagrammatic representation of a portion of the bit mapped memory plane with embedded character attributes, wherein a portion of the memory plane for a single character is shown. Each character is represented in the memory plane by a matrix 10. The matrix 10 is nine bits wide (numbered one through nine), and thirteen scan lines long (numbered zero through twelve). In the matrix 10 shown in FIG. 1, selected bits are turned on to form the character "A". It will be understood that each bit in the bit mapped memory plane, a portion of which is represented in FIG. 1, represents one picture element or pixel to be displayed on the screen of a cathode ray tube (CRT) of, for instance, a computer terminal. The scan lines zero, ten and twelve are left blank to provide the appropriate spacing between rows of characters on the CRT screen. As will be discussed further, scan line eleven may be used to provide an underline, where designated, of the characters displayed on the CRT screen. In the description of the invention herein, the bits representing pixels which are not part of the selected character, for instance the character "A" of FIG. 1, will be referred to as the background, and the pixels which form the character to be displayed will be referred to as the foreground.

As shown in FIG. 1, scan line zero of matrix 10 contains nine bits which may be selectively activated to represent attributes of the character of that nine by thirteen matrix. The first bit of scan line zero of the matrix 10 for each character is a reversed video (R) bit, the second bit is a half intensity or bold (H) bit, the third bit is an underline (U) bit, the fourth bit is a blink (B) bit, the fifth bit is a pixel (P) bit, the sixth bit is a suppress (S) bit, and the seventh, eight and ninth bits are general purpose bits (G0, G1 and G2) which are not used in the described embodiment but may be used for additional features or functions as desired. For instance, they could be used to provide extra intensity (for boldness), double underlying, or blinking at a second frequency. They could also be used, if desired, to implement a propagate attribute mode for serial field attributes, or to provide a protect function for data entry form applications.

The nine bits making up one scan line of one character are referred to herein as a byte, and such bits of scan line zero of one character are referred to herein as an attribute byte. Thus, in the present invention, the attribute byte for each character to be displayed on the screen is a portion of, and is passed to a display controller, as a part of each character to be displayed.

Figure 2:
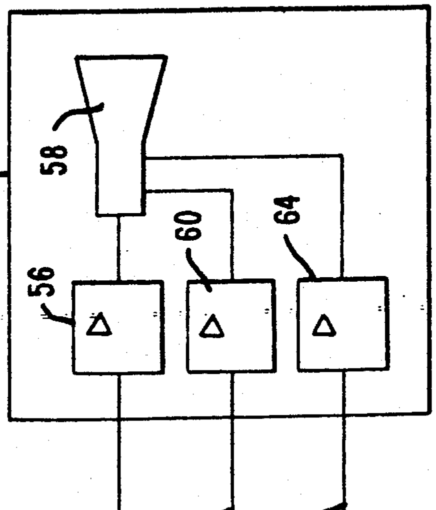
FIG. 2 is a block diagram of a system of the present invention.
Figure 2:
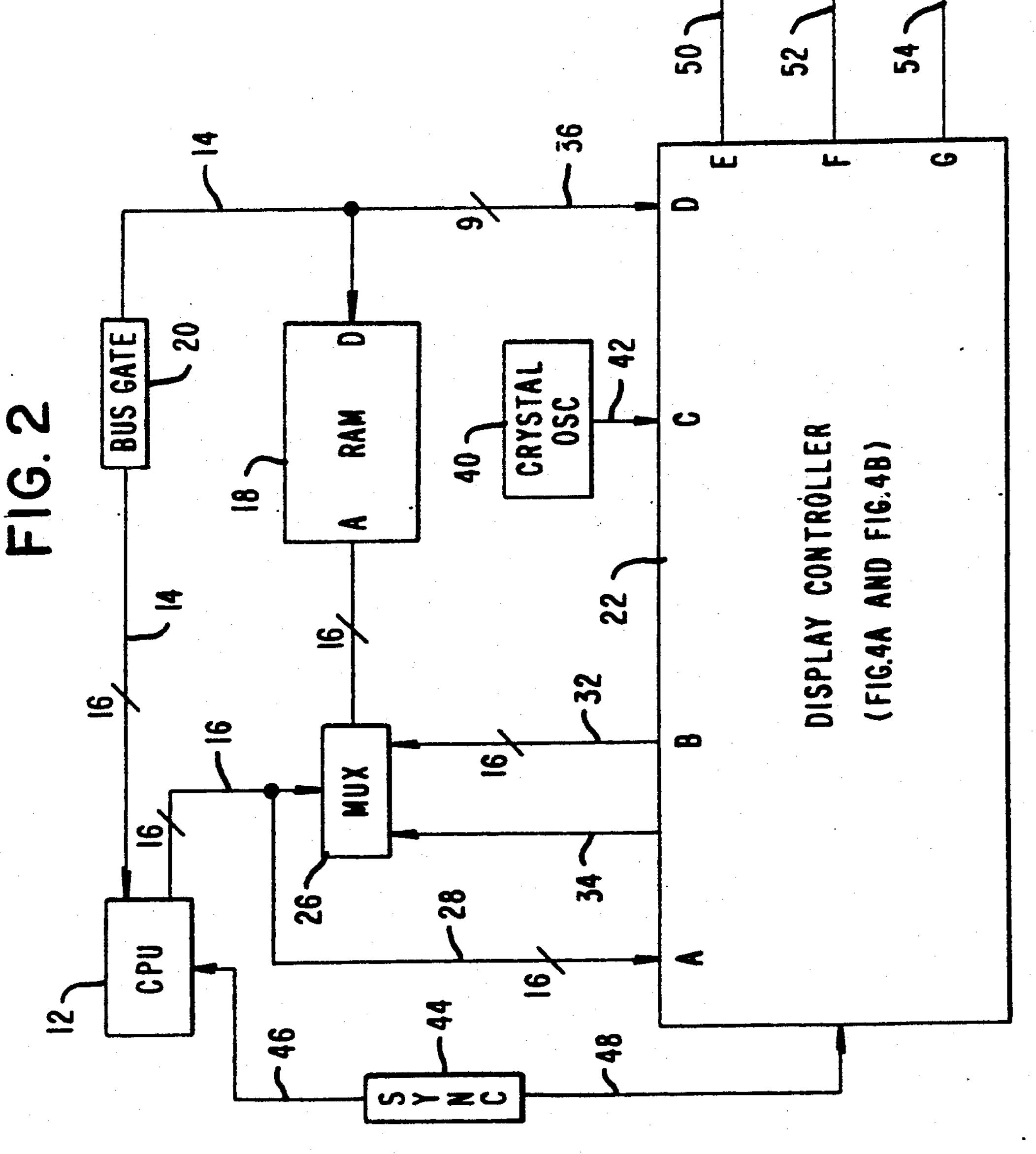

FIG. 2 is a block diagram of a system using the present invention. The system of FIG. 2 includes a central processing unit (CPU) 12, which may be a computer or microprocessor which has a CRT type video monitor device 24 for displaying data characters. The CPU 12 is connected to a multiconductor data bus 14 for sending or receiving data, and a multiconductor address bus 16 for supplying an address to a memory. The system includes a random access memory (RAM) 18 for storing data to be read into the CPU 12 or written from the CPU 12 into the RAM 18 by appropriate read/write commands over the data bus 14. A bi-directional gate 20 is in the data bus 14 between the RAM 18 and CPU 12 for controlling data transmission between the CPU 12 and the RAM 18. The CPU 12, the RAM 18, and the bi-directional bus gate 20 are well understood in the art and will not be discussed further herein.

A display controller 22 is provided to display a screen of data stored in the RAM 18 on the video monitor device 24. A multiplexer 26 is provided in the address bus 16 between the CPU 12 and the RAM 18. An address bus extension 28 is connected between the address bus 16 of the CPU 12 and an address input A of the display controller 22. The controller 22 includes a direct memory access (DMA) counter, to be discussed later, which supplies display addresses over a display address bus 32 via the multiplexer 26 to the RAM 18. A multiplexer control line 34 is connected between the display controller 22 and the multiplexer 26 for controlling transmission of the display address to the RAM 18. The display address may come from either the display controller 22 over the display address bus 32 or over the address bus 16 from the CPU 12. A data bus extension 36 is connected between the CPU data bus 14 and input D of the display controller 22. A crystal oscillator 40 supplies video dot clock signals to the display controller 22 over conductor 42, and a synchronizer means (SYNC) 44 synchronizes both the CPU 12 and display controller 22 over conductors 46 and 48, respectively.

The video monitor device 24 receives video signals over conductor 50 from the display controller 22, vertical drive signals over conductor 52 and horizontal drive signals over conductor 54. As is known, the video monitor device 24 includes a video amplifier 56 for receiving and amplifying a video signal for the electron gun of a CRT device 58, a vertical amplifier 60 for receiving vertical drive signals over conductor 52, and a horizontal amplifier 64 for receiving horizontal drive signals over conductor 54. As is well known, the horizontal amplifier 64, when energized by the horizontal drive signal, generates a ramp signal which sweeps an electron beam horizontally across the face of the CRT 58, and the vertical amplifier 60 generates a ramp signal which sweeps the electron beam vertically down the face of the CRT 58. The operation of such video monitor device 24 is well understood in the art and will not be explained further herein.

It can thus be seen that a full screen of information may be written into the RAM 18 by the CPU 12. The addresses for the placement of the screen data are passed over the RAM address bus 16 through the multiplexer 26 to the address terminal A of the RAM 18. The data may be passed, a byte at a time, over the data bus 14 through the bus gate 20 to the data terminal D of the RAM 18. When that portion of the RAM 18 which represents the screen of the CRT 58 (referred to herein as the bit plane memory) is thus loaded, the display controller 22 may access the screen data a byte at a time by sending an address over the bus 32 via the multiplexer 26. The screen data is then passed from the RAM 18 to the display controller 22, a byte at a time, via data bus extension 36. The starting address of the data to appear at the top of the screen is always zero in this description. The starting address could be passed by the CPU 12 to the display controller 22 over the address buses 16 and 28. However, for clarity of exposition, the starting address of the data for the top of screen will always be scan line zero. Thus, no partial rows of text can be displayed as would be required by a scroll action requiring incremental movement. However, such a design could be implemented, if desired.

The bit plane memory in the RAM 18 may be accessed starting at the designated address for the top of the screen byte. Certain global attributes to be applied to the entire screen, or portions of the screen, may be passed over the data buses 14 and 36 to the display controller 22 and identified by a specified RAM address transmitted by the CPU 12 over the address buses 16 and 28. Appropriate circuitry, to be discussed later herein, is provided in the display controller 22 to recognize global attribute commands from the CPU 12.

Figure 3:
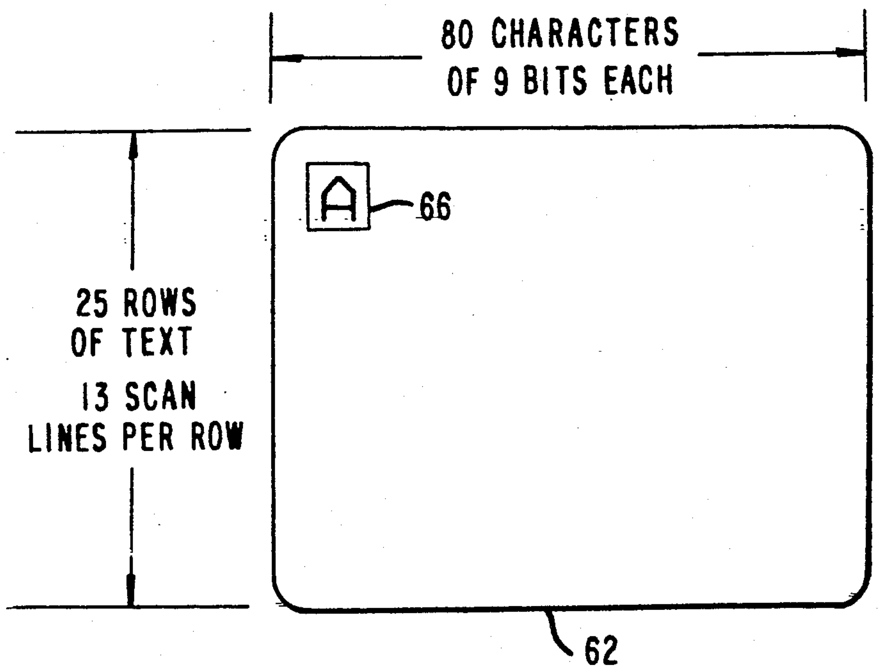
FIG. 3 is a diagram of the screen of a CRT display device of the system of FIG. 2.

FIG. 3 is a representation of a screen 62 of the CRT 58 of FIG. 2. The screen 62 has a display character "A" in a matrix 66 at the first display position at the top of the screen 62. As discussed in connection with matrix 10 of FIG. 1, the matrix 66 may be nine pixels wide and have thirteen scan lines. The characters displayed on the screen are arranged in rows with each row having a set number of characters. In the example used herein, each row contains eighty characters with a total of twenty-five rows of text being displayed on the screen 62 at one time. As discussed previously, if each of the nine bits of the character matrix 66 is considered to be one byte, the entire screen of characters may be represented by eighty bytes per scan line times thirteen scan lines per character times twenty-five rows or 26,000 bytes. Thus, to store the bit plane memory for the entire contents of the screen 62, the RAM 18 of FIG. 2 must contain storage for at least 26,000 bytes.

Provision is made in the display controller 22 of FIG. 2 to count the number of characters to be displayed in each row for controlling the horizontal drive signal output on conductor 54. The controller 22 typically counts one hundred characters per row to provide time equivalent to twenty characters for flyback in the horizontal amplifier 64. A total of 325 scan lines are required to provide twenty-five rows of characters with each row having thirteen scan lines. Time equivalent to an additional thirty scan lines is provided by the display controller 22 to allow for vertical retrace of the vertical amplifier 60 of FIG. 2. Thus, the vertical drive signal on conductor 52 is active during scan lines 1 through 325, and is inactive for a time equivalent to scan lines 326 through 355 to allow for the vertical retrace. The horizontal drive signal on conductor 54 is active for a time equivalent to the display of characters one through eighty of each row, and is not active for a time equivalent to the display of characters eighty-one through one hundred to provide for the horizontal flyback.

Figure 4A:
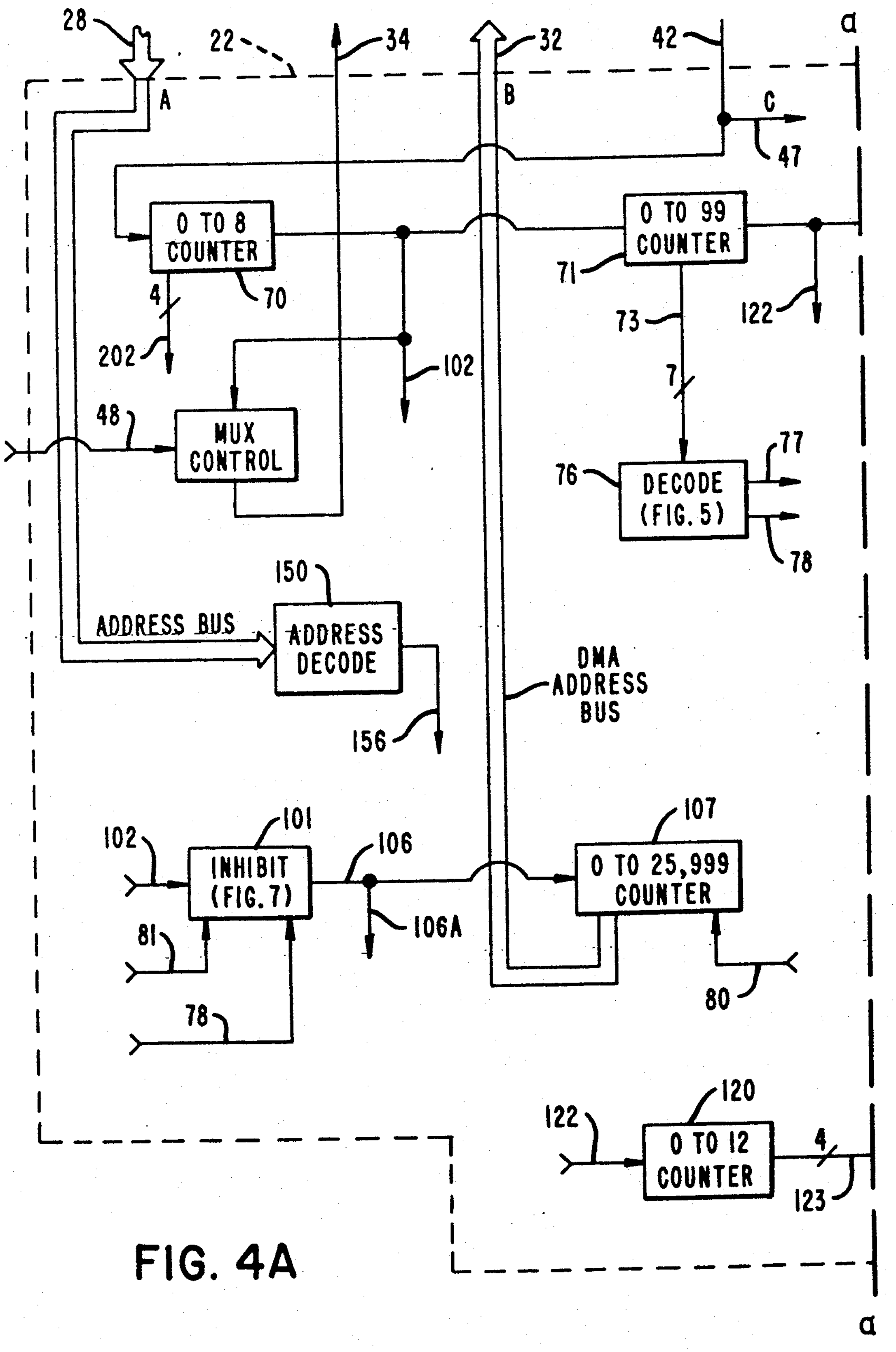
FIGS. 4A and B, joined along line a—a, form a block diagram of the display controller of the system of FIG. 2.
Figure 4B:
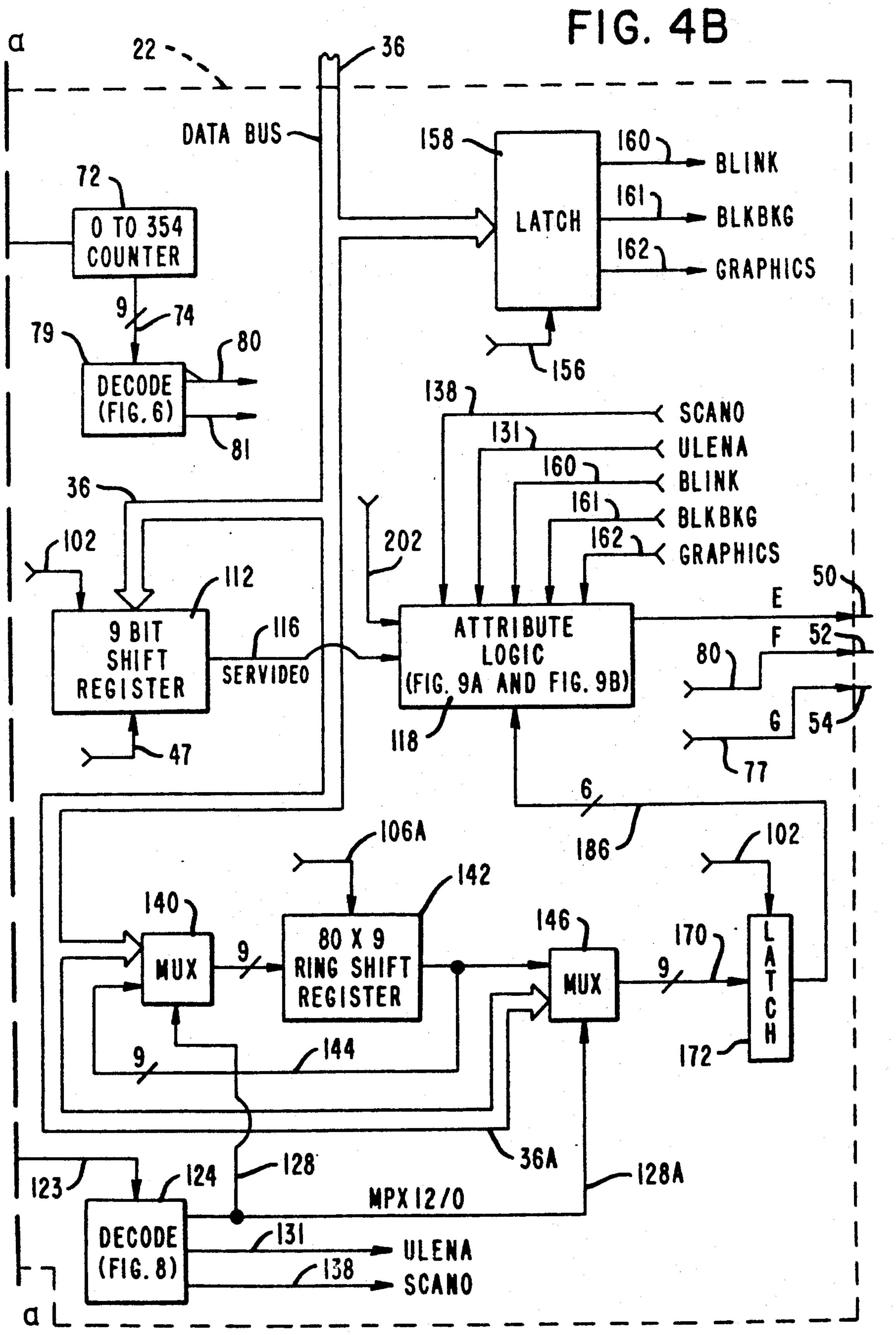

FIGS. 4A and 4B form a block diagram of the display controller 22 of FIG. 2. The display controller 22 includes a modulo nine counter 70, whose input receives the video dot clock signal over conductor 42 from the crystal oscillator 40 of FIG. 2. The output of the counter 70 is connected to the input of a modulo one hundred counter 71, whose output is connected to the input of a modulo 355 counter 72 (see FIG. 4B). The counter 70 counts nine video dot clock signals from the crystal oscillator 40 and outputs a character clock signal on conductor 102 to indicate the beginning of a new character. The counter 71 counts the character clocks signals output by the counter 70 and outputs a scan clock signal on conductor 122 to indicate the beginning of a new scan line. The counter 72 counts 355 scan clock signals from the output of counter 71 to keep track of the number of scan lines displayed on the screen 62 of FIG. 3. The counter 71 also outputs seven bits over bus 73 to give the number of characters counted by counter 71. Similarly, counter 72 outputs a nine bit value over bus 74 to indicate the number of scan lines counted by the counter 72. The characters counted by the counter 71 are inputted to a decode circuit 76 for use in generating a horizontal drive signal and a horizontal blanking signal to be outputted on outputs 77 and 78, respectively. The scan number outputted over bus 74 by the counter 72 is inputted into a decode circuit 79 for generating a vertical drive signal and a vertical blanking signal on conductors 80 and 81, respectively. The vertical drive signal on conductor 80 is connected to terminal F of the display controller 22 and the horizontal drive signal on conductor 77 is connected to terminal G of the display controller (see FIG. 4B)

Figure 5:
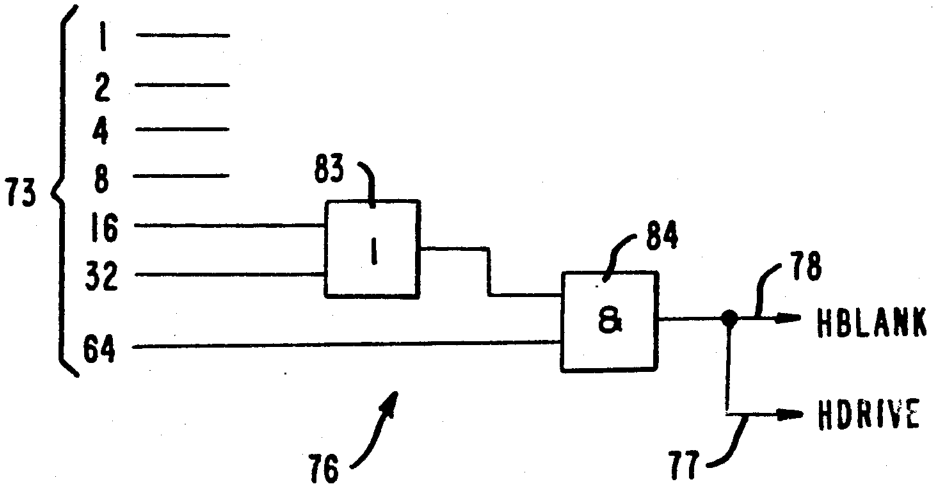
FIG. 5 is a schematic diagram of a decode circuit of the display controller.

FIG. 5 is a schematic diagram of the decode circuit 76 of FIG. 4A. The decode circuit 76 has an OR gate 83 whose input is connected to the fifth and sixth bits of the inputted character number over the bus 73 from counter 71. The output of the OR gate 83 is inputted to one input of an AND gate 84, and a second input of the AND gate 84 receives the seventh bit from the bus 73. The output of the AND gate 84 provides the horizontal drive signal (HDRIVE) on conductor 77 and the horizontal blanking signal (HBLANK) on conductor 78. Thus, the HBLANK and the HDRIVE signals are enabled when the character count from counter 71 of FIG. 4A is between eighty and one hundred.

Figure 6:
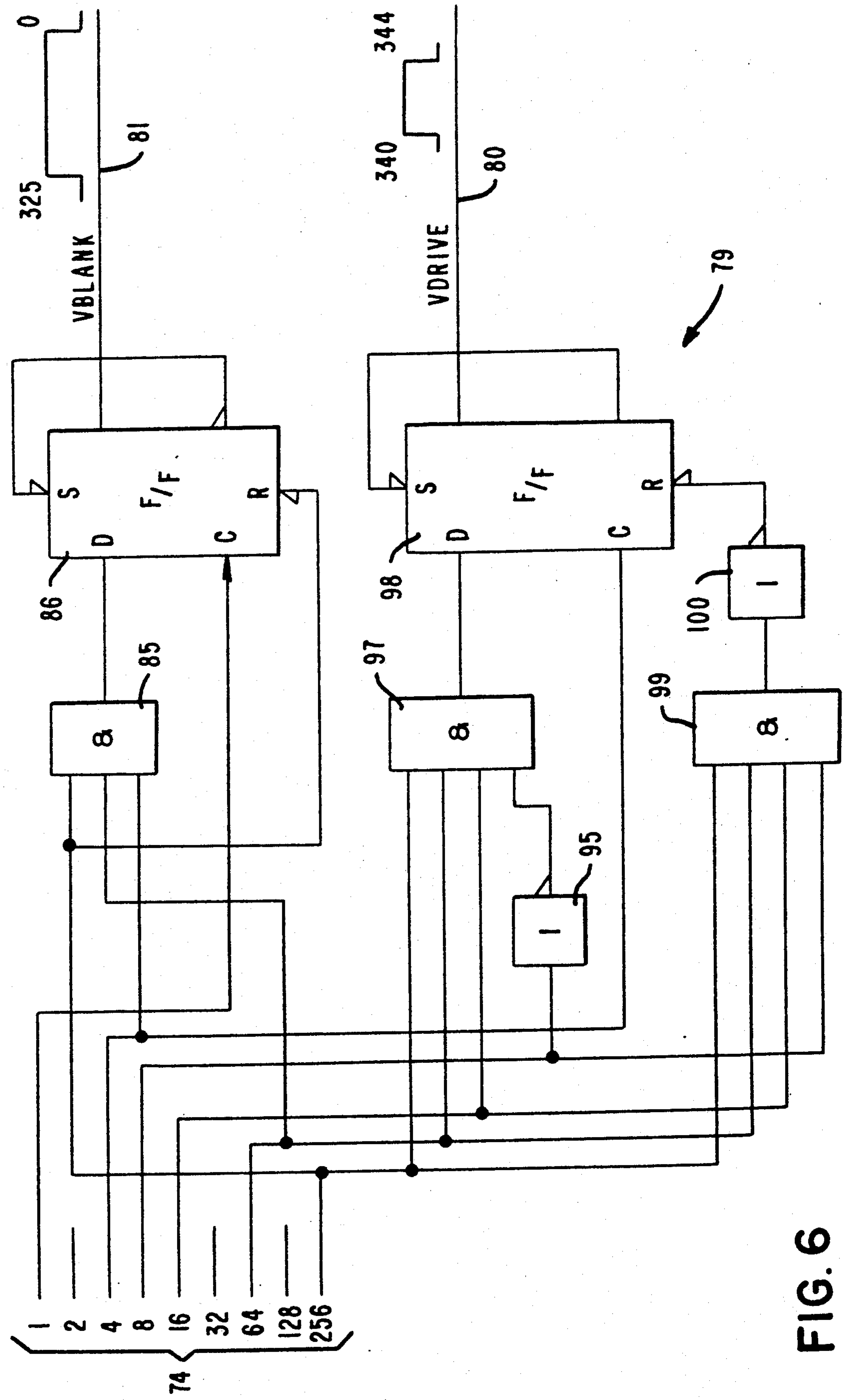
FIG. 6 is a schematic diagram of another decode circuit of the display controller.

FIG. 6 is a schematic diagram of the decode circuit 79 of FIG. 4B. The decode circuit 79 has an AND gate 85 whose inputs are connected to the third, seventh and ninth bits of the scan line number signal outputted on the bus 74 from the counter of 72. When these bits are turned on, the value of the scan line number is equal to 324, and the output of the AND gate 85 is enabled. The output of the AND gate 85 is connected to the data terminal of a D-type flip flop 86. The clock terminal of the flip flop 86 is connected to the first bit of the bus 74. The reset terminal of the flip flop 86 is connected to the ninth bit, and the inverted output of the flip flop 86 is connected its set input. The non-inverted output of the flip flop 86 is connected to conductor 81 for supplying the vertical blanking (VBLANK) signal of FIG. 4B. On the next positive going edge of the first bit occurring after the scan line number value from counter 72 is equal to 324 (value 325), the non-inverted output of the flip flop 86 goes high. Thus, the VBLANK signal on conductor 81 goes high at scan line number 325 and stays high until the ninth bit turns off when the scan line number value from counter 72 becomes zero.

The decode circuit 79 also includes an AND gate 97 whose inputs are connected to the inverted fourth bit from an inverter 95, and to the fifth bit, the seventh bit and the ninth bit received on bus 74 from counter 72. When the count from counter 72 is equal to 336, the inputs of the AND gate 97 are enabled, and the output of the AND gate 97 goes high. The output of the AND gate 97 is connected to the data terminal of a D-type flip flop 98, whose clock terminal is connected to the third bit of the bus 74. An AND gate 99 has its input terminals connected to the fourth, fifth, seventh and ninth bits of the bus 74. When these bits are enabled, the scan line number value from the counter 72 is equal to 344. The output of the AND gate 99 then goes high, which is inverted by an inverter 100, to a low, which is connected to the reset terminal of the D-type flip flop 98. The inverted output of the flip flop 98 is connected to its set input, and the non-inverted output is connected to conductor 80 of FIG. 4B for providing the vertical drive (VDRIVE) signal. It will thus be seen that when the third bit is turned on after the scan line number value of counter 72 reaches 336 (the value 340), the VDRIVE signal on conductor 80 goes high and remains high until the scan line number value of counter 72 reaches 344.

Returning now to FIG. 4A, it is seen that the display controller 22 includes an inhibit circuit 101 which inhibits passing of the character clock signal received over conductor 102 from the output of the counter 70 during either vertical blanking or horizontal blanking.

Figure 7:
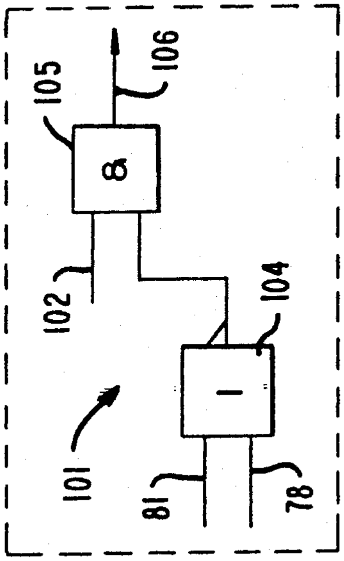
FIG. 7 is a schematic diagram of an inhibit circuit of the display controller.

FIG. 7, on the drawing containing FIG. 2, is a schematic diagram of a circuit which may be used for the inhibit circuit 101 of FIG. 4A. An OR gate 104 has one input connected to conductor 78 for receiving the HBLANK signal from decode circuit 76, and has a second input connected to conductor 81 for receiving the VBLANK signal from the decode circuit 79 of FIG. 4B. The output of the OR gate 104 is connected to one input of an AND gate 105 whose second input is connected to conductor 102 for receiving the character clock signal from the counter 70 of FIG. 4A. The output of the AND gate 105 is connected to conductor 106 (see also FIG. 4A). Thus, the inhibit circuit 101 passes character clock signals from conductor 102 only when both the VBLANK and HBLANK signals are not enabled. The conductor 106 is connected to one input of a direct memory access (DMA) counter 107 (see FIG. 4A). The DMA counter 107 is a modulo 26,000 counter which counts from zero to 25,999. Conductor 80 provides the vertical drive signal to the counter 107 to reset it for each frame. Thus, RAM address zero is always the first data fetched for the top of the screen 62. The DMA counter 107 is connected to the display address bus 32 for supplying direct memory access addresses to the multiplexer 26 for addressing the RAM 18 (see FIG. 2). It will be understood that when the DMA counter 107 sends an address to the RAM 18 over buses 32 and 16 via multiplexer 26, one byte of pixel display data is returned to the display controller 22 over bus 36 from data stored at that address in the RAM 18.

Referring to FIG. 4B, pixel data on bus 36 is clocked into a nine bit shift register 112 by a character clock signal received over conductor 102 from the counter 70. The bits of the byte received over bus 36 are shifted one at a time from the shift register 112 by each video dot clock signal received over conductors 42 and 47 from the crystal oscillator 40 (see FIGS. 2 and 4A). Serial bits are shifted out of the shift register 112 onto conductor 116 as the serial video (SERVIDEO) signal. When the SERVIDEO signal has a value of one, the screen 62 foreground is enabled to form a character, and when the SERVIDEO signal has a value of zero, the screen 62 background is enabled. The SERVIDEO signal from output 116 of shift register 112 is inputted into the attribute logic 118, to be discussed later with respect to FIGS. 9A and 9B.

Referring to FIG. 4A, a modulo 13 counter 120 is provided which counts scan clocks received over line 122 from the output of counter 71. The counter 120 counts from zero to twelve which represents the scan line being displayed for each character (see FIG. 1). The output of the counter 120 is a binary value on a four bit bus 123 which is inputted into a decode circuit 124 (FIG. 4B).

Figure 8:
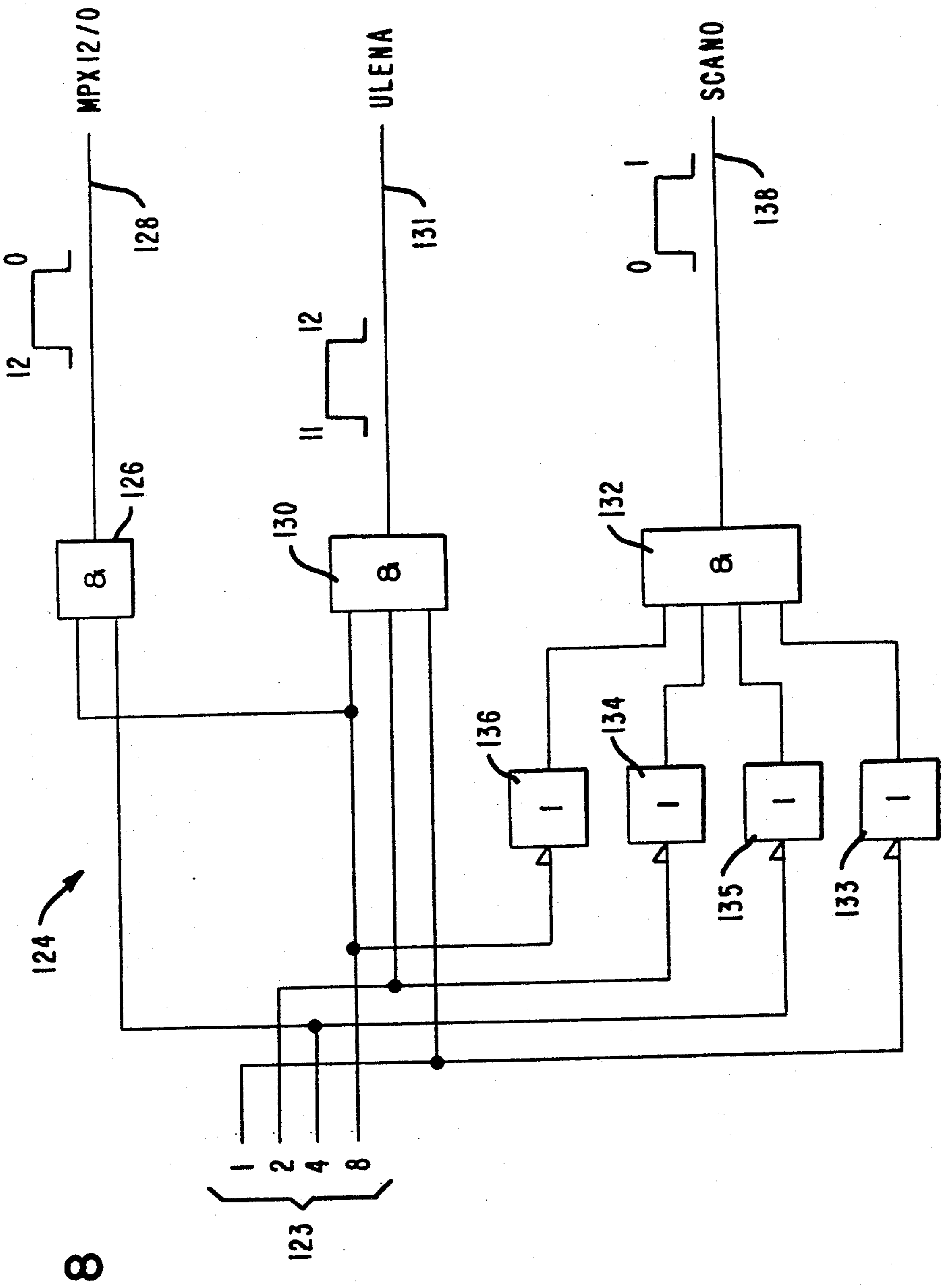
FIG. 8 is a schematic diagram of another decode circuit of the display controller.

FIG. 8 is a schematic diagram of the decode circuit 124 of FIG. 4B. As illustrated, the decode circuit 124 includes an AND gate 126 whose inputs are connected to the third and fourth bits of the bus 123, and whose output provides a multiplexer control (MPX12/0) signal on conductor 128, to be explained. An AND circuit 130 is also provided having its inputs connected to the first, second and fourth bits of the bus 123. As discussed hereinafter with respect to FIG. 9A, when the count on bus 123 is equal to eleven, the output of AND gate 130 will be an underline enable (ULENA) signal on conductor 131. When the ULENA signal on conductor 131 is active, the count of counter 120 will be eleven indicating that the eleventh scan line of a row of characters is being displayed.

An AND gate 132 has its inputs connected to inverted first, second, third and fourth bits inverted by inverters 133, 134, 135 and 136, respectively. The output of AND gate 132 on conductor 138 is a scan line zero (SCAN0) signal which indicates that the first scan line, or scan line zero, of a row of characters is being displayed.

Returning to FIG. 4B, a multiplexer 140 is controlled by the MPX12/0 signal on conductor 128 from the decode circuit 124 just explained. A ring shift register 142 has its input connected to the output of the multiplexer 140 for receiving bytes of pixel data from the data bus 36. The ring shift register 142 forms part of a selecting circuit to select eighty bytes of attribute data from the data bus 36, one byte for each character to be displayed in a complete row of data on the CRT screen 62, as previously discussed. One input of the multiplexer 140 is connected to the data bus 36 from the RAM 18 (see FIG. 2). A data bus 144 is provided from the output of the ring shift register 142 to the other input of the multiplexer 140. The output of the ring shift register 142 is also provided to a multiplexer 146, which also receives attribute bytes from the bus 36 by way of a bus extension 36A. Loading data to, and bypassing data around, ring shift register 142 is controlled by the MPX12/0 signal provided over conductor 128 to the multiplexers 140 and 146.

On scan line zero, the MPX12/0 signal on conductor 128 will be active for passing the attribute data bytes through the multiplexer 140 from the data bus 36 to the ring shift register 142, thereby storing the attributes of a complete row of eighty characters to be displayed on the screen 62. As the attribute bytes are loaded into the shift register 112, they are also by-passed around the ring shift register 142 on bus 36A and through multiplexer 146 to a latch 172 to provide proper background attribute control for scan line zero.

Conductor 106A, from the inhibit circuit 101, provides the shifts through ring shift register 142 in groups of eighty pulses. In the scan lines 1-12 of the current row, an attribute byte will be shifted out of the register 142 to be used for the character presently being displayed. The attribute byte is also fed back into the ring shift register 142 over the bus 144 and through the multiplexer 140 (with the MPX12/0 signal now inactive) to be used in the following scan lines of the same row of eighty characters, until all thirteen scan lines of that row have been displayed. The attribute byte output from the ring shift register 142 is passed through MUX 146 and placed on a bus 170 to the attribute latch 172 and transmitted to the attribute logic 118 over bus 186.

As noted earlier, while each attribute byte has nine attribute bits, only six of the bits ("R", "H", "U", "B", "P", and "S" as described in conjunction with (FIG. 1) are used in the described embodiment. Accordingly, only six bits are stored in latch 172 and presented to attribute logic 118. Further, the attribute bits are clocked into latch 172 by the character clock signal on conductor 102 at the same time that the scan line zero data is clocked into the shift register 112, so that the attribute bits for scan line zero are presented to the attribute logic 118 at the same time that the first serialized data bit for scan line zero is also presented to the attribute logic 118 as the signal SERVIDEO.

An address decode circuit 150 of FIG. 4A is provided to decode the address on the RAM address bus extension 28 to determine if the address passed by the CPU 12 to the RAM 18 is the address for the location of the RAM 18 for storing global functions; i.e. functions which, when enabled, continuously affect the display on the CRT screen 62. When the address for global functions is recognized by the address decode circuit 150, a load latch signal on conductor 156 is enabled to latch data on the data bus 36 into a latch 158, (see FIG. 4B). These global functions may include a blink rate signal (BLINK) on conductor 160, a blank background signal (BLKBKG) on conductor 161, and a graphics signal (GRAPHICS) on conductor 162.

Figure 9A:
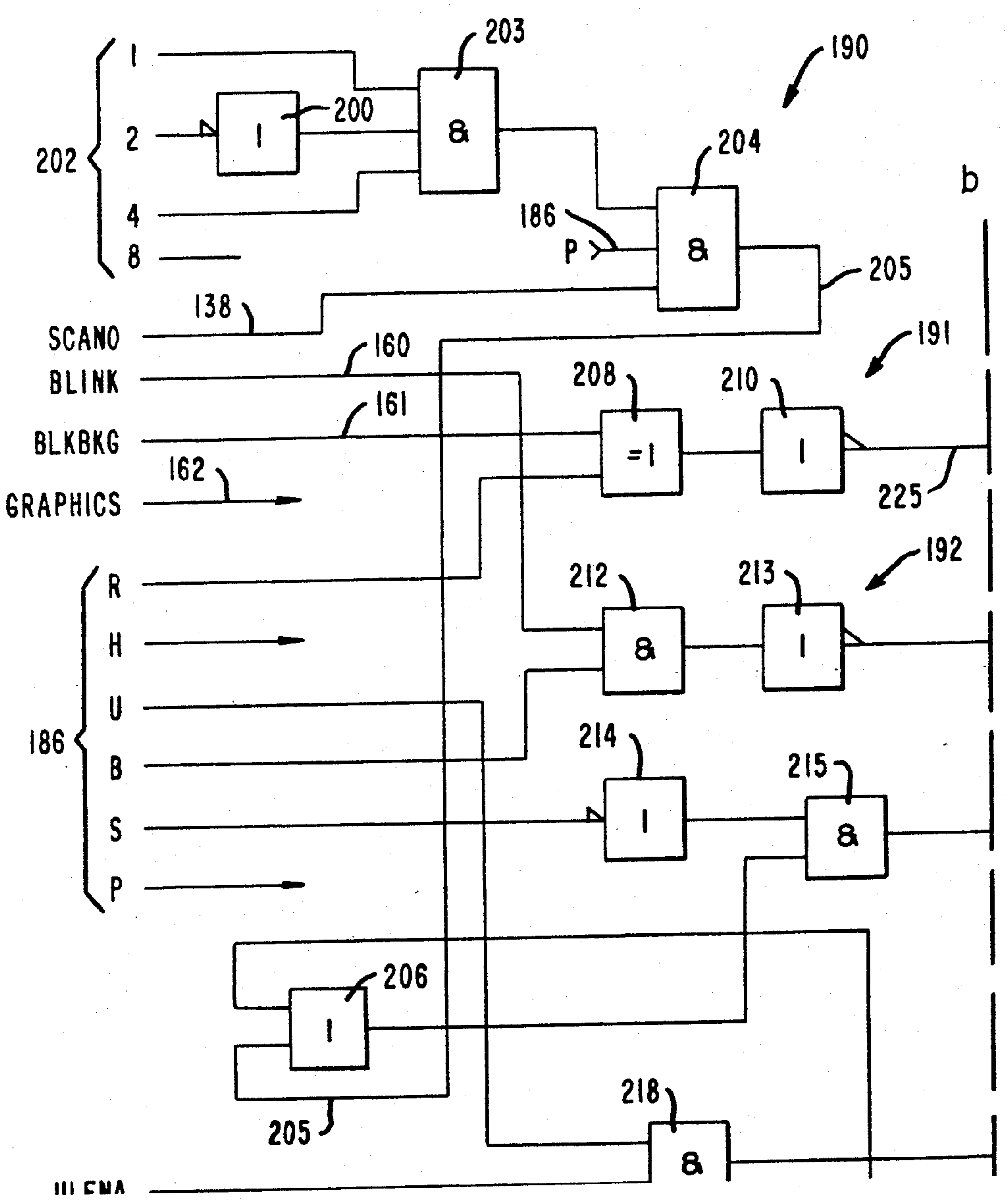
Figure 9A:
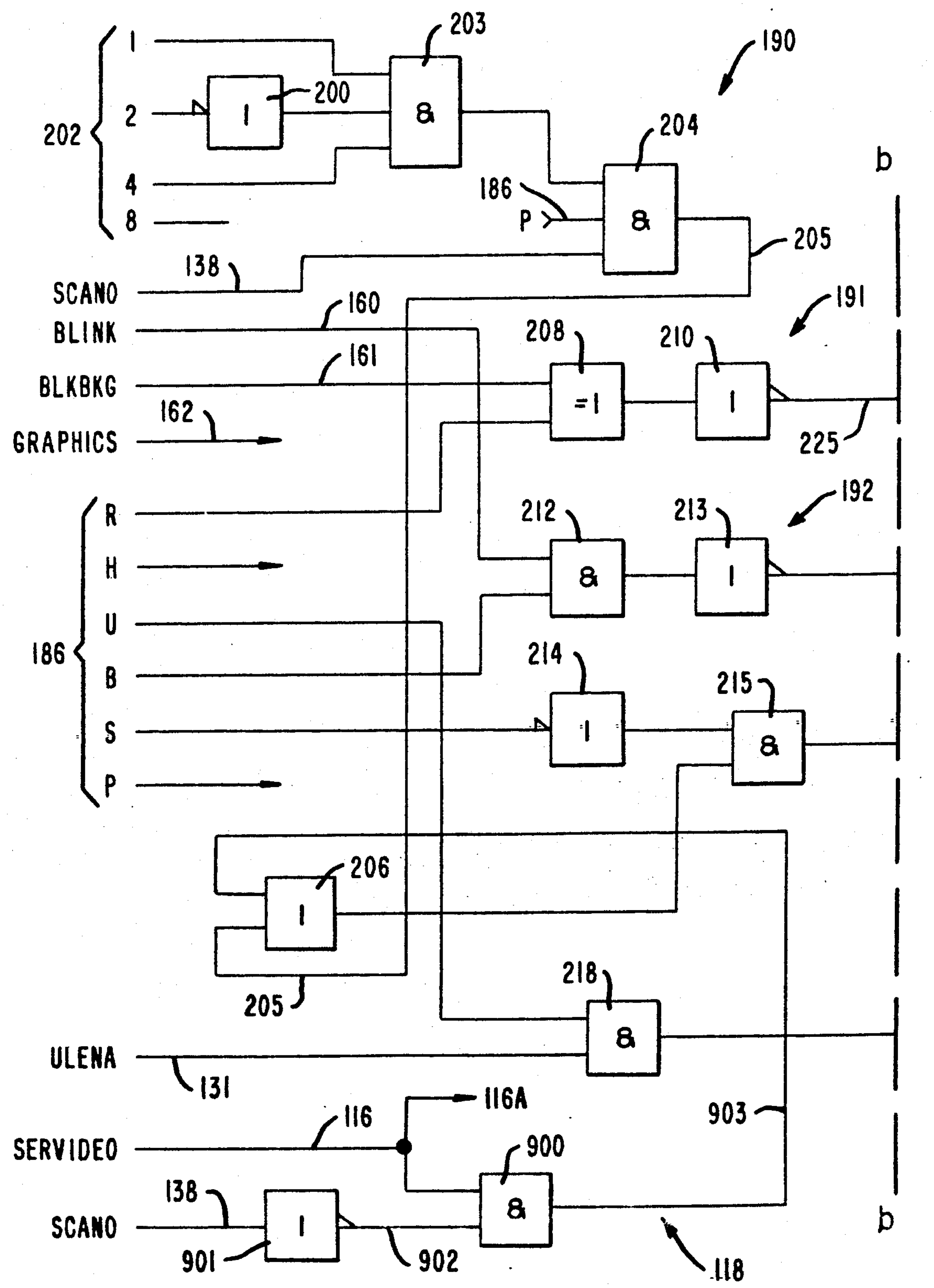

FIGS. 9A and 9B form a schematic diagram of the attribute logic 118 of FIG. 4B. The attribute logic 118 includes a circuit 190 (FIG. 9A) for determining if the fifth pixel of scan line zero of each character is to be turned on when the pixel (P) attribute is activated, a circuit 191 (FIG. 9A) for decoding the global functions from latch 158 of FIG. 4B, a decode circuit 192 (FIG. 9A) for decoding the attribute bits passed by the attribute latch 172 and an output circuit 193 (FIG. 9B) for outputting a video signal over conductor 50 to the monitor device 24 of FIG. 2.

The circuit 190 includes an inverter 200 for inverting the second bit from a bus 202 which carries the count from counter 70 of FIG. 4A. The first and third bits and inverted second bit are inputted into an AND gate 203 to determine if the count on the bus 202 is equal to five. The output of the AND gate 203 is inputted into an AND gate 204 with the SCAN0 signal on conductor 138 from the decode circuit 124 of FIG. 4B, and the pixel attribute bit (P) from bus 186 of FIG. 4B. The circuit 190 thus turns on the fifth pixel of scan line zero for those characters having the pixel attribute bit (P) enabled. The pixel attribute is used for a business graphics (orthogonal only) implementation in a text mode. The output 205 of the AND gate 204 is inputted into an OR gate 206. The SERVIDEO signal on conductor 116 is inputted into an AND gate 900 while the SCAN0 signal on conductor 138 is inputted into an inverter 901 whose output 902 is likewise inputted into the AND 900. Thus, the output 903 of AND gate 900, which is connected to one input of the OR gate 206, is blanked during scan line zero, which is the attribute scan. In this way, the attribute bits in the attribute byte are not displayed on the CRT screen 62.

The circuit 191 includes an exclusive OR gate 208 having one input connected to the blank background (BLKBKG) signal on conductor 161 from latch 158 of FIG. 4B. The other input of exclusive OR gate 208 is connected to the reverse attribute bit (R) of the attribute byte on bus 186. The output of exclusive OR gate 208 is inverted by an inverter 210 whose output is connected to conductor 225. Thus, the signal on conductor 225 is high if one only of either the BLKBKG global function on conductor 161, or the reverse attribute bit (R) is enabled.

The circuit 192 includes an AND gate 212 having one input connected to the BLINK global function on conductor 160, and another input connected to the blank attribute bit (B) of the attribute byte on bus 186. The output of the AND gate 212 is inverted by an inverter 213. An inverter 214 is included to invert the suppress attribute bit (S) of the attribute byte on bus 186. The output of the inverter 214 is inputted into an AND gate 215, whose other input is connected to the output of the OR gate 206. The output of the inverter 213 and the output of the AND gate 215 are inputted into an AND gate 216 of FIG. 9B. Thus, the output of the AND gate 216 contains the condition of a pixel in the foreground when the global functions and the attributes are applied.

An AND gate 218 of FIG. 9A has one input connected to the underline attribute bit (U) from the attribute byte on bus 186, and a second input connected to conductor 131 for receiving the ULENA signal from decode circuit 124 of FIG. 4B. As discussed in connection with FIG. 8, the ULENA signal is active only during the eleventh scan of a character. Thus, if the underline attribute is enabled, the bits of the foreground will be turned on during the eleventh scan of the character to form an underline. An OR gate 220 of FIG. 9B has one input connected to the output of the AND gate 216, and one input connected to the output of the AND gate 218. Thus, the output on conductor 222 of the AND gate 220 carries the foreground state of the pixel to be displayed and the underline when the underline attribute is enabled.

An exclusive OR gate 224 has one input connected to the conductor 222 for receiving the output of OR gate 220, and one input connected to conductor 225 for receiving the output of inverter 210 of FIG. 9A. Thus, the output of the exclusive OR gate 224 contains the foreground state of the pixel to be displayed with all of the attributes and global functions applied except the half intensity attribute (H). A multiplexer 230, which is controlled by the GRAPHICS global function bit on conductor 162, has the SERVIDEO signal on conductor 116A of FIG. 9A inputted into one input thereof and has the output of the exclusive OR gate 224 inputted into a second input thereof over conductor 232. Thus, when the GRAPHICS global function bit on conductor 162 is enabled, the state of the pixel on the conductor 116A is multiplexed onto the conductor 234 by the multiplexer 230. On the other hand, when the GRAPHICS global function bit on conductor 162 is disabled, the state of the pixel on the conductor 232 is multiplexed onto the conductor 234 by the multiplexer 230. A non-inverting open collector amplifier 235 receives the multiplexed value via conductor 234 and its output is connected to a node 236 of a voltage divider circuit formed by resistors 240 and 241. The GRAPHICS global function bit on conductor 162 is inverted by an inverter 242 and inputted over a conductor 243 to one input of a NAND gate 244. A second input of the NAND gate 244 receives the half intensity attribute bit (H) of the attribute byte on bus 186. The NAND gate 244 has an open collector output. Thus, when the GRAPHICS global function bit on conductor 162 is not enabled (GRAPHICS* is high) and the half intensity attribute bit (H) is enabled, the output of NAND gate 244 is grounded, thereby grounding one end of resistor 241 and forming a voltage divider with the resulting voltage on node 236 being at a set percentage of its normal value. This will result in the signal on conductor 232 being provided at a lower intensity to the CRT screen 62. In the GRAPHICS mode (GRAPHICS is high), the SERVIDEO signal will appear at node 236 at its normal value, thus providing regular intensity to the CRT screen 62. In the non-graphics mode (GRAPHICS* is high) with the half intensity attribute bit low, the signal on conductor 232 will appear at node 236 at its normal value. An NPN transistor 250 provides the video out signal on conductor 50 dependent upon the voltage at node 236 which appears on its base.

Thus, a system has been described which provides the aforementioned objects of the invention. It will be understood by those skilled in the art that the disclosed embodiment is exemplary only, and that various elements disclosed may be replaced by equivalents without departing from the spirit of the invention hereof and which equivalents are covered by the appended claims.

What is claimed is:

1. A video display controller for controlling the display of characters stored in a bit plane memory, each character being arranged in a set number of scan lines with a set number of data bits in each scan line, one scan line of data bits in each character being attribute bits of its character, the characters to be displayed being arranged in rows, with a set number of characters per row, said video display controller comprising:

data bus means for receiving data bytes from the bit plane memory, each of said data bytes including the data bits of a single scan line of a character to be displayed;

shifting means having an input connected to said data bus means and an output, said shifting means for sequentially placing each data bit of a data byte on its output;

selecting means connected to said data bus means for selecting attribute bytes from said data bus means, each of said attribute bytes having the attribute bits of its corresponding character to be displayed, said selecting means comprising:

register means for storing the attribute bytes of an entire row of characters to be displayed, said register means having an input for receiving an attribute byte and an output for outputting an attribute byte; and a multiplexer having a first input connected to said data bus means, a second input connected to the output of said register means and an output connected to the input of said register means, said multiplexer for multiplexing the attribute bytes of an entire row of characters to be displayed to said register means, and for sequentially multiplexing the attribute byte on the output of said register means back to its input after each scan line of a character to be displayed; and attribute logic means having a first input connected to the output of said shifting means and a second input connected to said selecting means, said attribute logic means for applying the attribute bits of an attribute byte to the data bits of a scan line of a corresponding character to be displayed.

2. The video display controller of claim 1 wherein the attribute bits are in scan line zero of the character to be displayed, said selecting means further comprising:

first counting means for counting the scan lines of the data bytes being received by said data bus means;

decoding means connected to said first counting means for determining when data bytes of scan line zero of the characters to be displayed are being received by said data bus means; and said multiplexer means having control means connected to said decoding means for multiplexing data bytes from its first input during the receipt of scan line zero data bytes, and for multiplexing data bytes from its second input during the receipt of other than scan line zero data bytes.

3. The video display controller of claim 2 wherein said register means is a ring shift register having a shift control input means connected to said first counting means for shifting the contents of said shift register means at the beginning of each scan line counted by said first counting means, and wherein said selecting means further comprises a second multiplexer having a first input connected to said data bus means, a second input connected to the output of said register means, and control means connected to said decoding means for multiplexing data bytes from its first input during the receipt of scan line zero data bytes and for multiplexing data bytes from its second input during the receipt of other than scan line zero data bytes, so that attribute bytes are both loaded into and bypassed around said register means during the receipt of scan line zero data bytes.

4. The video display controller of claim 3 wherein said attribute logic means includes means for blocking the display of the data bits of scan line zero.

5. The video display controller of claim 4 further comprising:

address bus means for supplying the addresses in the bit plane memory of characters to be displayed; and second counting means connected to said address bus means for placing on said address bus means, addresses in the bit plane memory of characters to be displayed.

6. The video display controller of claim 5 further comprising:

inhibit means connected to said first counting means and controlling said second counting means for grouping the addresses of characters in the bit plane memory means in groups, each group containing the addresses of characters to be displayed in each of said rows.

7. The video display controller of claim 6 further comprising:

horizontal drive means connected to said first counting means for generating a horizontal drive signal for the display of each of said rows of characters; and vertical drive means connected to said first counting means for generating a vertical drive signal for the display of a set number of said rows.

8. The video display controller of claim 1 further comprising:

a global attribute latch connected to said data bus means, said global attribute latch for receiving and latching global attribute bits from said data bus means;

said attribute logic means is connected to said global attribute latch and includes means for applying the global attribute bits to all of said data bits received on the input of said attribute logic means.

9. The video display controller of claim 8 further comprising:

second address bus means for receiving the addresses of data stored in the bit plane memory;

second decode means connected to said second address bus means for decoding the address of the global attributes stored in the bit plane memory; and latch control means connected to said decode means and to said global attribute latch, said latch control means for causing said global attribute latch to latch global attribute bits on said data bus means when the address of the global attributes is decoded by said third decode means.

10. A system for displaying video characters with visual attributes applied thereto comprising:

a computer;

data bus means connected to said computer;

first address bus means connected to said computer;

memory means having a data input connected to said data bus means, said memory means for receiving from said computer data bytes having a set number of data bits, each of said data bytes representing one scan line of a character to be displayed, and wherein one data byte is an attribute byte containing attribute data bits for applying to all of the data bits of a single character to be displayed, said memory means further having an address input connected to said first address bus means for receiving therefrom addresses of data bytes to be written into or read from said memory means;

display controller means having a data input connected to said data bus means for receiving from said memory means data bytes of characters to be displayed, selecting means for selecting the attribute byte of a character to be displayed, attribute logic means for applying the attribute bits of each selected attribute byte to the corresponding data bytes of a character to be displayed, means for blocking the display of the scan line containing the attribute bits of each character to be displayed, and a video output for outputting data signals representing the character to be displayed with the attribute bits applied; and video display means connected to said display controller means for displaying characters from said display controller means with the attribute bits applied.

11. The system of claim 10 further comprising:

second address bus means connected to said display controller means;

counter means in said display controller means connected to said second address bus means for placing thereon addresses of data bytes of characters to be displayed; and multiplexer means having an input connected to said first address bus means and having an input connected to said second address bus means, said multiplexer means having a first condition for passing addresses from said computer to said memory means such that said computer may write data bytes of characters to be displayed into said memory means, and having a second condition for passing addresses from said display controller means over said second data bus such that said display controller means may read data bytes of characters to be displayed from said memory means.

12. The system of claim 11 further comprising:

a global attribute latch in said display controller means connected to said data bus means for receiving global attribute bits; and global logic means in said attribute logic means for applying said global attribute bits to all the data bytes of the characters to be displayed by said video display means.

13. In a video display controller controlling the display of characters stored in a bit plane memory, each character being arranged in a set number of scan lines with a set number of data bits in each scan line, the characters to be displayed being arranged in rows, with a set number of characters per row, a method comprising:

including attribute bits in one scan line of data bits of each character in the bit memory plane, said one scan line representing background of its corresponding character;

receiving data bytes from the bit plane memory, each of said data bytes including the data bits of a single scan line of a character to be displayed;

sequentially arranging the data bits of a delayed data byte;

selecting attribute bytes from said received data bytes, each of said attribute bytes being the attribute bits in said one scan line of its corresponding character to be displayed said selecting step comprising:

storing in a register means the attribute bytes of an entire row of characters to be displayed; and sequentially multiplexing the attribute byte on the output of said register means back to its input after each scan line of a character to be displayed; and applying the attribute bits of an attribute byte to said sequentially arranged data bits of a scan line of a corresponding character to be displayed.

14. In a video display controller controlling the display of characters stored in a bit plane memory, each character being arranged in a set number of scan lines with a set number of data bits in each scan line, a method comprising:

including attribute bits in one scan line of data bits of each character in the bit memory plane, said one scan line representing background of its corresponding character;

receiving data bytes from the bit plane memory, each of said data bytes including the data bits of a single scan line of a character to be displayed;

sequentially arranging the data bits of a delayed data byte;

selecting attribute bytes from said received data bytes, each of said attribute bytes being the attribute bits in said one scan line of its corresponding character to be displayed; said selecting step comprising:

counting the scan lines of the data bytes being received;

determining when data bytes of scan line zero of the characters to be displayed are being received;

multiplexing data bytes from the output of said register means back to its input during the receipt of other than scan line zero data bytes; and applying the attribute bits of an attribute byte to said sequentially arranged data bits of a scan line of a corresponding character to be displayed.

15. The method of claim 14 further comprising:

decoding when the data bits of scan line zero are being provided; and blocking the displaying of said data bits of scan line zero.

* * * * *

UNITED STATES PATENT AND TRADEMARK OFFICE
CERTIFICATE OF CORRECTION

PATENT NO. : 5,012,232

DATED : April 30, 1991

INVENTOR(S) : Richard J. Fadem

It is certified that error appears in the above-identified patent and that said Letters Patent is hereby corrected as shown below:

Column 14, line 52, prior to the first word - multiplexing - insert "multiplexing said received data bytes for storage in register means during the receipt of scan line zero data bytes; and"

Signed and Sealed this

Sixth Day of April, 1993

Attest:

STEPHEN G. KUNIN

*Attesting Officer*

*Acting Commissioner of Patents and Trademarks*